United States Patent
Murmurachi

(10) Patent No.: US 6,717,695 B1
(45) Date of Patent: Apr. 6, 2004

(54) METHOD AND CIRCUIT FOR THE PRODUCTION OF COMPRESSED OR EXPANDED IMAGES, AND PRINTER WITH SUCH CIRCUIT

(75) Inventor: Alexander Murmurachi, Augsburg (DE)

(73) Assignee: Océ Printing Systems GmbH, Poing (GB)

(*) Notice: Subject to any disclaimer, the term of this patent is extended or adjusted under 35 U.S.C. 154(b) by 0 days.

(21) Appl. No.: 09/381,992

(22) PCT Filed: Mar. 26, 1998

(86) PCT No.: PCT/DE98/00906

§ 371 (c)(1),
(2), (4) Date: Jan. 19, 2000

(87) PCT Pub. No.: WO98/43206

PCT Pub. Date: Oct. 1, 1998

(30) Foreign Application Priority Data

Mar. 27, 1997 (DE) .......................................... 197 13 080

(51) Int. Cl.⁷ .............................................. G06K 15/00
(52) U.S. Cl. .................... 358/1.2; 358/1.1; 358/1.2; 358/1.5; 358/1.6; 358/1.8; 358/1.9; 382/194; 382/298; 382/299; 382/303
(58) Field of Search .................... 358/1.1, 1.2, 1.5, 358/1.6, 1.8, 1.9, 3.11, 3.13, 1.16, 535, 451; 382/194, 298, 299, 301

(56) References Cited

U.S. PATENT DOCUMENTS

| | | | |
|---|---|---|---|
| 4,275,450 A | 6/1981 | Potter | 382/298 |
| 4,394,693 A * | 7/1983 | Shirley | 358/1.2 |
| 4,528,693 A * | 7/1985 | Pearson et al. | 382/299 |
| 4,742,553 A | 5/1988 | Irwin | 382/299 |
| 4,747,154 A | 5/1988 | Suzuki et al. | 382/298 |
| 5,305,398 A * | 4/1994 | Klein et al. | 382/298 |
| 5,768,482 A * | 6/1998 | Winter et al. | 358/1.9 |
| 5,778,158 A * | 7/1998 | Fujii et al. | 358/1.2 |
| 6,469,801 B1 * | 10/2002 | Telle | 358/1.2 |

FOREIGN PATENT DOCUMENTS

| | | |
|---|---|---|
| DE | 3418624 A1 | 11/1984 |
| DE | 3418624 C2 | 6/1987 |

OTHER PUBLICATIONS

IBM Technical Disclosure Bulletin, vol. 29, No. 3, Aug. 1986, pp. 1286–1988 Image–Reduction Circuit?.

* cited by examiner

Primary Examiner—Edward Coles
Assistant Examiner—Zebene Sanbet
(74) Attorney, Agent, or Firm—Schiff Hardin LLP

(57) ABSTRACT

A method for producing compressed or expanded images is provided. For compression or expansion in a direction of the lines of the image, a line factor is determined as a starting value for a line variable. After this, the following steps are carried out cyclically: if a momentary value of the line variable is greater than zero, the source image data being processed is copied and used as a target image data Next, the momentary value of the line variable is reduced by a numerical value. If the momentary value of the line variable is not greater than zero, the next source image data is used in the place of the source image data being treated. Then the value of the line factor is added to the momentary value of the line variable. A column based expansion or compression is also provided for expanding or compressing an image in the direction of the columns. A circuit is provided for performing the expansion or compression, and a printer having the circuit is also provided.

18 Claims, 8 Drawing Sheets a)

b)

a)

b)

FIG. 7a

Figure 1:
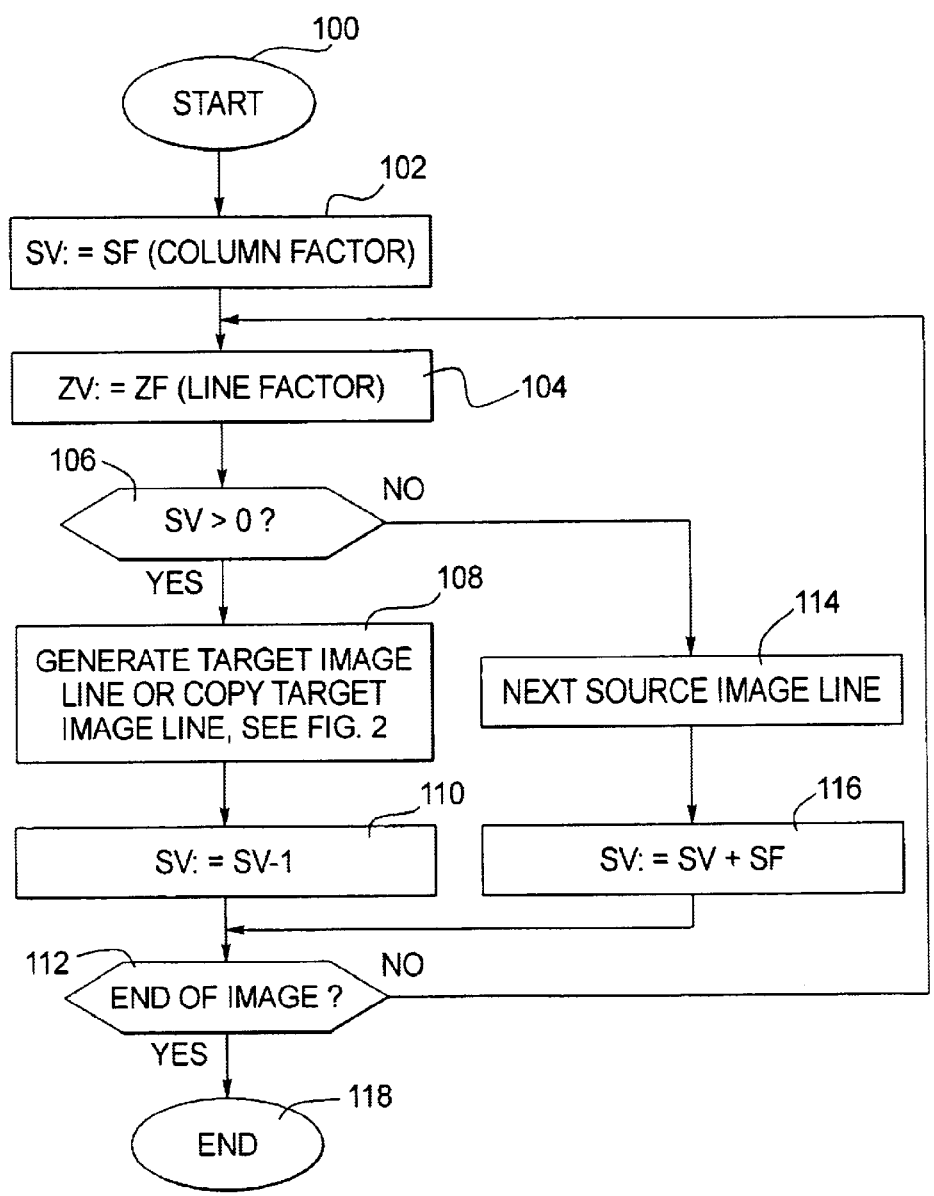

```
px = scox
py = scoy
get pixel
    if (px > 0)                    else
    copy pixel          get pixel
    px - = 1            px + = scox
    while (--cx)
        if (py > 0)
        copy last line
        py - = 1
    while (py > 0)
    px = scox, py + scoy
while (--cy)
```

FIG. 7b

```
px = scox
py = scoy
get pixel
    if (px < 0)                    else
    copy pixel          get pixel
    px + = 1            px - = scox
    while (--cx)
        if (py < 0)
        copy last line
        py + = 1
    while (py > 0)
    px = scox, py = - scoy
while (--cy)
```

METHOD AND CIRCUIT FOR THE PRODUCTION OF COMPRESSED OR EXPANDED IMAGES, AND PRINTER WITH SUCH CIRCUIT

FIELD OF THE INVENTION

The invention is directed to a method for processing image data, particularly in printer, whereby a source image to be processed contains source picture elements arranged matrix-like to which a respective source image datum is allocated, this determining the presentation of the respective source picture element. A target image arising in the further-processing of the source image data contains target picture elements arranged matrix-like to which a respective target image datum is allocated, this defining the presentation of the respective target picture element.

Such methods are called scaling methods and are utilized, for example, in printers when target image data of a print image or, respectively, target image are produced from the source image data of a source image, said target image being expanded or compressed in line direction compared to the source image or, respectively, having a higher or lower resolution in line direction than the source image. A scaling factor thereby indicates the ratio between target image resolution and source image resolution in a specific image direction.

When, for example, scaling is carried out line-by-line, then a line factor is prescribed as scaling factor that defines the ratio of the number of line picture elements per line of the target image relative to the number of source picture elements per line of the source image. The line factor sometimes has a value that is not a whole number. When a target image having a resolution of 600 dpi in line direction is to be produced from a source image having a resolution of 240 dpi (picture elements per 25.4 mm) in line direction, then the line factor has, for example, the value 2.5. The line factor likewise has the value 2.5 when, given the same size of the source picture elements and the target picture elements, a target image is to be produced from the source image whose extent in line direction amounts to 2.5 times the value of the extent of the source image in line direction. In other words, the source image is stretched by the factor 2.5 in line direction.

The line factor is less than 1 when a target image having reduced resolution in line direction is produced from the source image or when the target image is compressed in sine direction compared to the source image.

BACKGROUND OF THE INVENTION

A method that implements a transformation of the locus coordinates between source image and target image is known, for example, for generating the target data. In this method, however, a plurality of multiplications and similar operations are implemented that require a plurality of processor clocks.

U.S. Pat. No. 4,275,450 discloses a method and a circuit arrangement for enlarging or reducing images wherein the image data are selectively sluiced through a plurality of processing stages.

DE 34 18 624 C2 discloses a scaling method wherein image data are converted line-by-line from a first raster into a second raster having different resolution. For demagnifying images (scaling factor<1), an initial value (for example, 5/16) is first set in an address counter, and the counter is incremented by a specific value (for example 5/8) with each processing step. Whenever the address counter exceeds a comparison value (for example 1), the current image datum is transferred into a buffer memory. The comparison value is thereby higher than the initial value. What is disadvantageous about this type of scaling is that the outermost picture elements at the image edges—particularly the first picture element at the beginning of the line—are suppressed because the initial value (5/8) is lower than the comparison value. This leads to image falsifications; in particular, edge lines having a width of one picture are not reproduced in the target image.

SUMMARY OF THE INVENTION

An object of the invention is to achieve a high processing speed and a true-to-the-original reproduction in the target image when scaling image data.

This object is inventively achieved by a procedure having the features of patent claims 1, 2, 4 and 15as well as by a circuit arrangement having the features of patent claim 13. Advantageous embodiments of the invention are recited in the subclaims.

According to the invention, a scaling variable is cyclically compared to a comparison value and, dependent on the comparison result, a decision is made as to whether a source image datum is accepted as target image datum. One thereby proceeds from a start value that is defined such that the first source picture datum is respectively accepted as target image datum under a predetermined comparison criterion in a group of source image data, for instance in an image row or in an image column.

When a source image datum has been taken as target image datum, the scaling variable is either added or subtracted by a constant value, particularly by the value one. When a source image data was not accepted as target image datum, the scaling variable is either subtracted or added by the scaling factor. The subtraction or, respectively, additions in both instances of the transfer behave mutually in the invention; when subtraction is carried out in the case of the data transfer, then adding is carried out in the case of non-transfer and vice versa.

In a preferred embodiment of the invention, the start value is identical to the scaling factor, the comparison value is zero, the value one is employed as constant and this is cyclically subtracted from the scaling variable. In another preferred embodiment of the invention, the start value is identical to the scaling factor, the comparison value is zero, the value one is employed as constant, and this is cyclically added to the scaling variable.

The invention is based on the consideration that the production of the target image is especially simple when only addition and subtraction operations are employed insofar as possible upon implementation of the method or, respectively, calculating operations whose execution requires only one clock or only a few clocks in a digital circuit arrangement. Particularly in a printer, the image data are successively transmitted to a print head. The method must therefore be designed such that an additional intermediate storage of the image data is avoided.

A high processing speed is achieved by assigning a scaling factor and by the following, cyclical processing of the source image data. In that a value whereat the first image datum is accepted is prescribed as start value, for example the first source image data of a row or column as first target image datum, the picture elements of the image lying at the start are correctly reproduced in any case, namely independently of the specific scaling factor (expansion or compression). Given an expansion of the image, at least the two first picture elements of a row or, respectively, the first two rows of an image are transferred into the target image data. The reproduction veracity in these edge regions is therefore significantly improved to the aforementioned and known methods. This advantage is particularly felt given graphic edge lines of images.

The invention is particularly suited for employment in a hard-wired, electronic circuit or in a user-specific integrated circuit (ASIC). A pipeline structure is particularly advantageous given such a circuit, the source image data being loaded therein from a first memory via a first data line into a control circuit for the execution of calculations and comparisons, and the calculated, target image data being deposited in a following, second memory. The second memory is connected to the control circuit via a second line that is separate from the first line. This arrangement allows a high processing speed because the loading and storing of the source or, respectively, target image data can ensue parallel in time.

Given a line-by-line, cyclical image data processing according to the invention, the source image data for successive source picture elements of at least one line of the source image are successively processed. The scaling factor here indicates the ratio of the number of target picture elements per line of the target image relative to the number of source picture elements per line of the source image. The line-by-line processing enables the processing of data stream of successive source image data without additional intermediate storing or, respectively, with only a small buffer memory for matching the processing speed to the speed of the occurrence of the source image data.

Given the line-by-line method according to the invention, the line factor is employed as start value for a line variable. Subsequently, the following steps are cyclically implemented:

a) when the momentary value of the line variable is greater than zero, the source image datum processed at the moment is copied and employed as target image datum; further, the momentary value of the line variable is reduced by the numerical value "1";

b) when the momentary value of the line variable is not greater than zero, the next source image datum is employed instead of the source image datum processed at the moment; further, the value of the line factor is added to the momentary value of the line variable.

Only interrogation operations, copying events, subtractions and additions need be carried out in step a and b. These operations require only a few clocks in a processor or, respectively, in a clocked circuit arrangement that does not process a program. In the subtraction, only the value "1" is subtracted, so that a deincrementation counter is also employed. The method of the invention can thus be implemented at high speed. The method of the invention is also simple because it contains essentially only two different method steps.

In the method of the invention, target image data for successive target picture elements of a row of the target image arise in succession. The target image data can be successively transmitted to the print head of a printer as target image data stream or can be stored in a buffer memory for further operations.

The invention can also be employed as a method operating column-by-column for processing image data, whereby a column factor is prescribed that determines the ratio of the number of target picture elements per column of the target image relative to the number of source picture elements per column of the source image. Column-by-column in this context means that the column is composed of whole lines of the source image or, respectively, of the target image. Steps that are essentially similar to the line-by-line method of the invention are implemented given the column-by-column method of the invention. The above considerations and technical effects thus also apply to the method functioning column-by-column according to the invention. However, column-by-column methods of the invention employ the column factor instead of the line factor and a column variable instead of the line variable.

Given the column-by-column method, the source image data are successively processed for successive lines of the source image. Target image data for target picture elements of a line of the target image are thereby generated according to a predetermined line processing method from the momentarily processed source image data for a line of the source image. In the predetermined line processing method, the source image data of a line are copied in the simplest case and employed as target image data of a target image line. In this case, the line factor, however, has the value "1".

In a development of the column-by-column method, the target image data are only generated according to the predetermined line processing method when target image data according to the line processing method have not yet been produced for is the source image data processed at the moment. When line image data were already produced, then a copy of these line image data is employed. This assumes that the line image data of a line of the target image generated according to the line processing method are stored until line image data of a new line are generated with the line processing method for other source image data. The storing of target image data for a line of the target image is preferably implemented when the column factor has a value greater than one. A repeated implementation of the line processing method for processing the same source image data of a line is avoided by storing the target image data. A copying of the target image data can be implemented faster than a re-calculation. The entire method thus also becomes faster.

In another development of the column-by-column method of the invention, the predetermined line processing method for processing source image date of a line essentially coincides with the line-by-line method of the invention. I.E., in addition to the method steps recited in patent claim 1, the method steps recited in patent claim 1, [sic] are implemented in order to generate the target image data of a line. As a result of this measure, a uniform method derives for the expansion and compression or, respectively, for increasing the resolution and diminishing the resolution both in line direction as well as in column direction. In this method, the column factor and the line factor can be selected independently of one another.

The subtraction of the value 1 and the adding of the line factor or, respectively, of the column factor to the line variable or, respectively, column variable is advantageously implemented such that the operations are implemented separately for the pre-decimal point value and the post-decimal point value of the line variable or, respectively, the column variable. As a result of this measure, two adders having a bit width of 16 bits can be employed instead of one adder having, for example, 32 bits. This is particularly advantageous when the clock frequency for two smaller adders is lower than for one larger adder in an integrated circuit, for example in an ASIC (application-specific integrated circuit).

Given a separate processing of the pre-decimal point value and post-decimal value, the pre-decimal point value can be processed as counter value in a counter since it need always be diminished only by the numerical value 1. A counter can be constructed with less circuit-oriented outlay than an adder or subtraction.

The separation into pre-decimal point value and post-decimal value in the processing of the line variable and/or of the column variable advantageously allows an adder for whole-numbered additions to be employed for the post-decimal point value. Such an adder can be more simply realized in circuit-oriented terms than an adder for rational numbers, i.e. numbers with a decimal point.

In another advantageous embodiment of the invention, the target image data of a plurality of groups of target image data are produced given a scaling factor that is higher than 1, being produced from the source image data of a group of source image data being processed at the moment in that only one group of target image data is generated from the group of source image data, this is stored and subsequently copied until the next group of source image data is processed. One line, in particular, is employed as group. A repetition of calculating events can thereby avoided and, consequently, the processing speed for the data of an overall image can be increased.

The aforementioned technical effects and advantages of the inventive method also apply to the corresponding circuit arrangements.

BRIEF DESCRIPTIONS OF THE DRAWINGS

Figure 2:
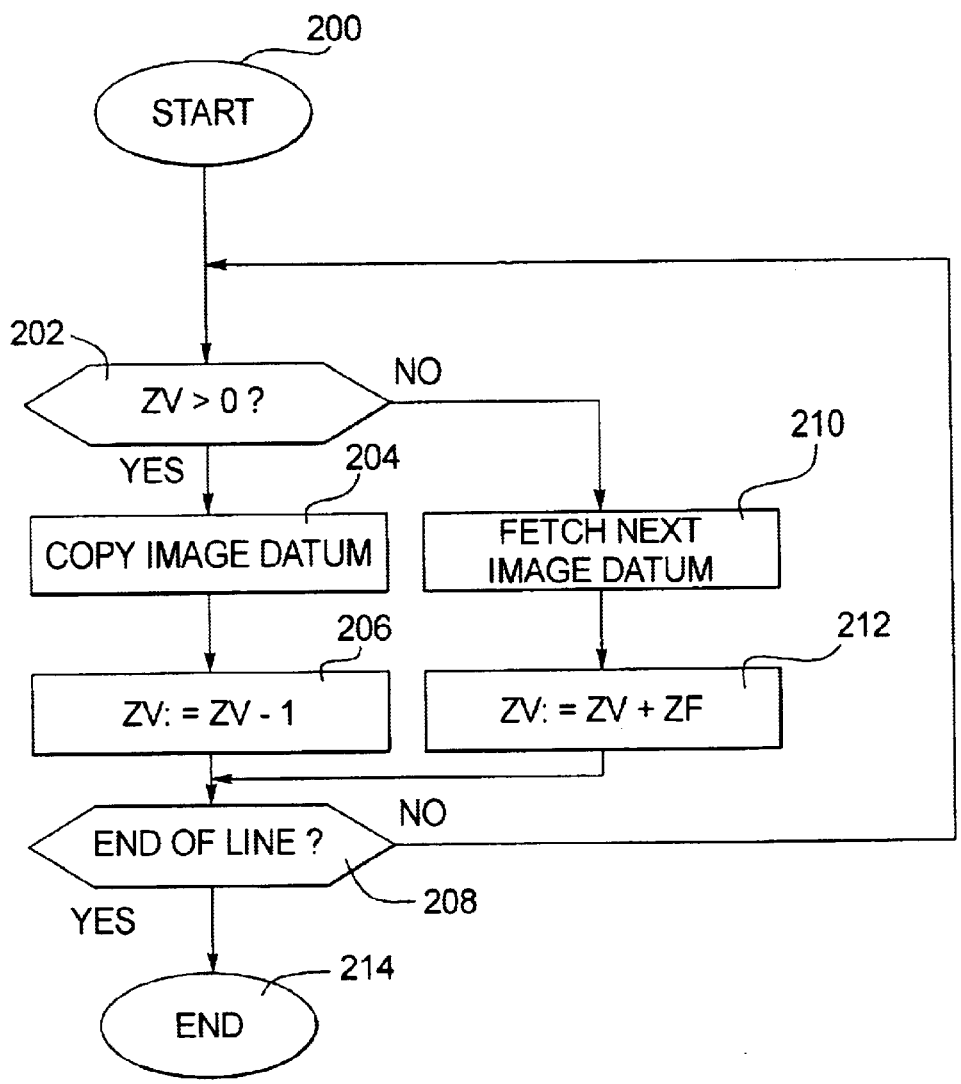
Figure 3:
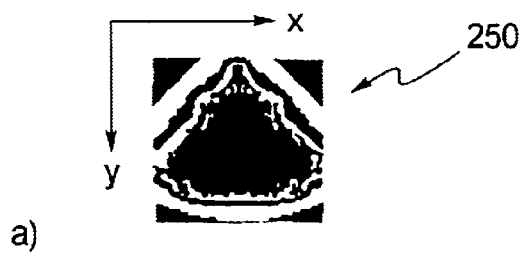
Figure 3:
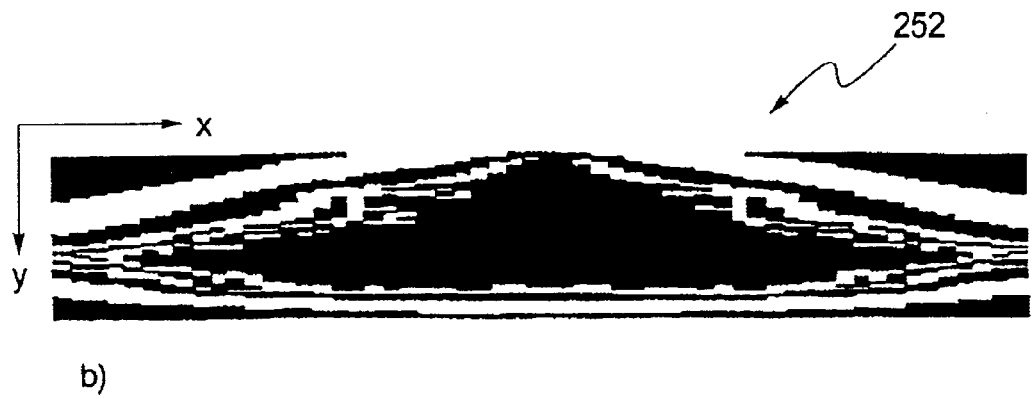
Figure 4:
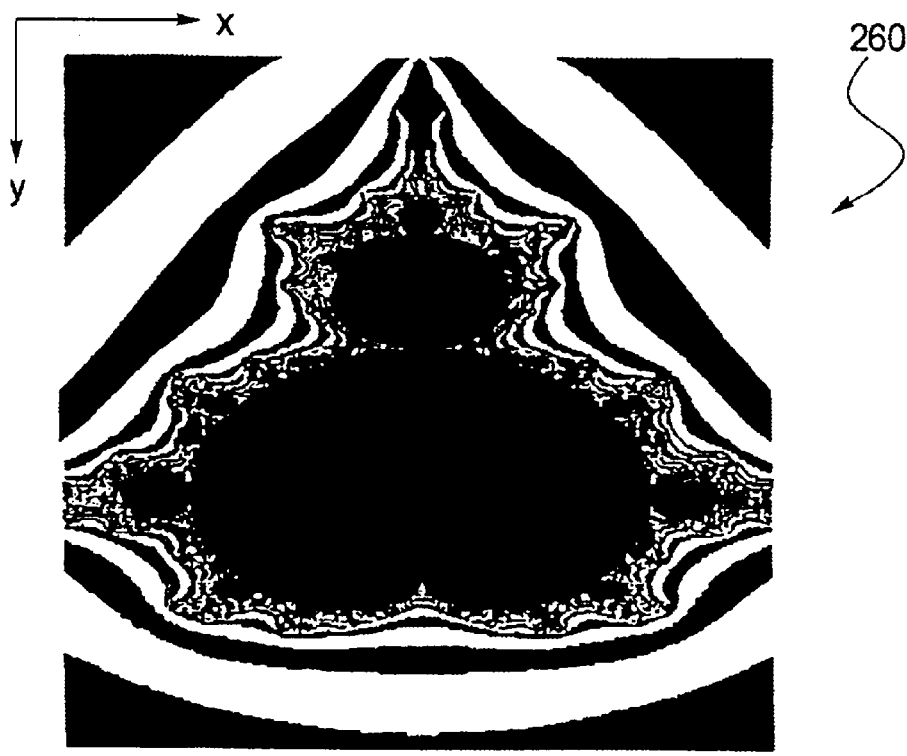
Figure 4:
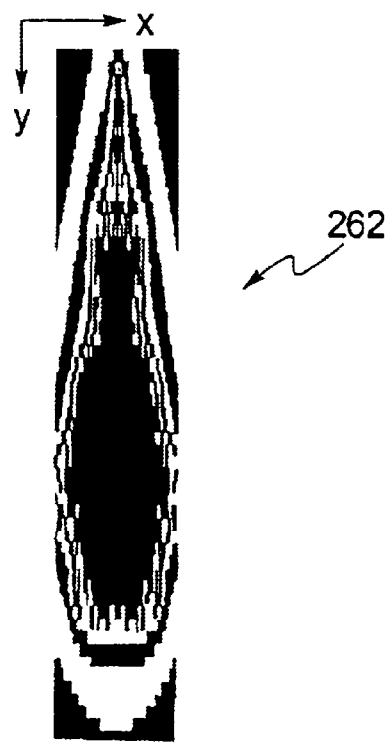
Figure 5A:
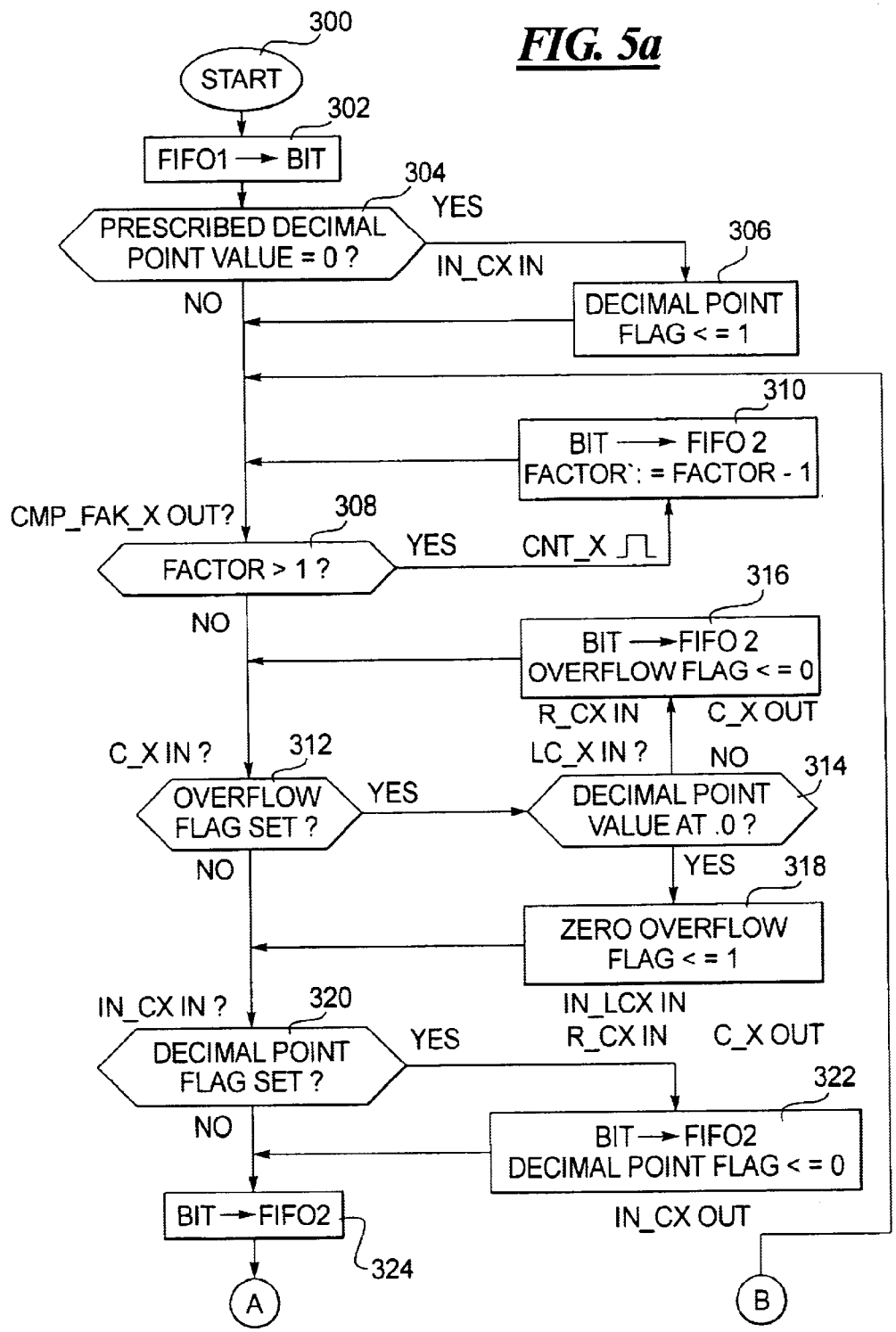
Figure 5B:
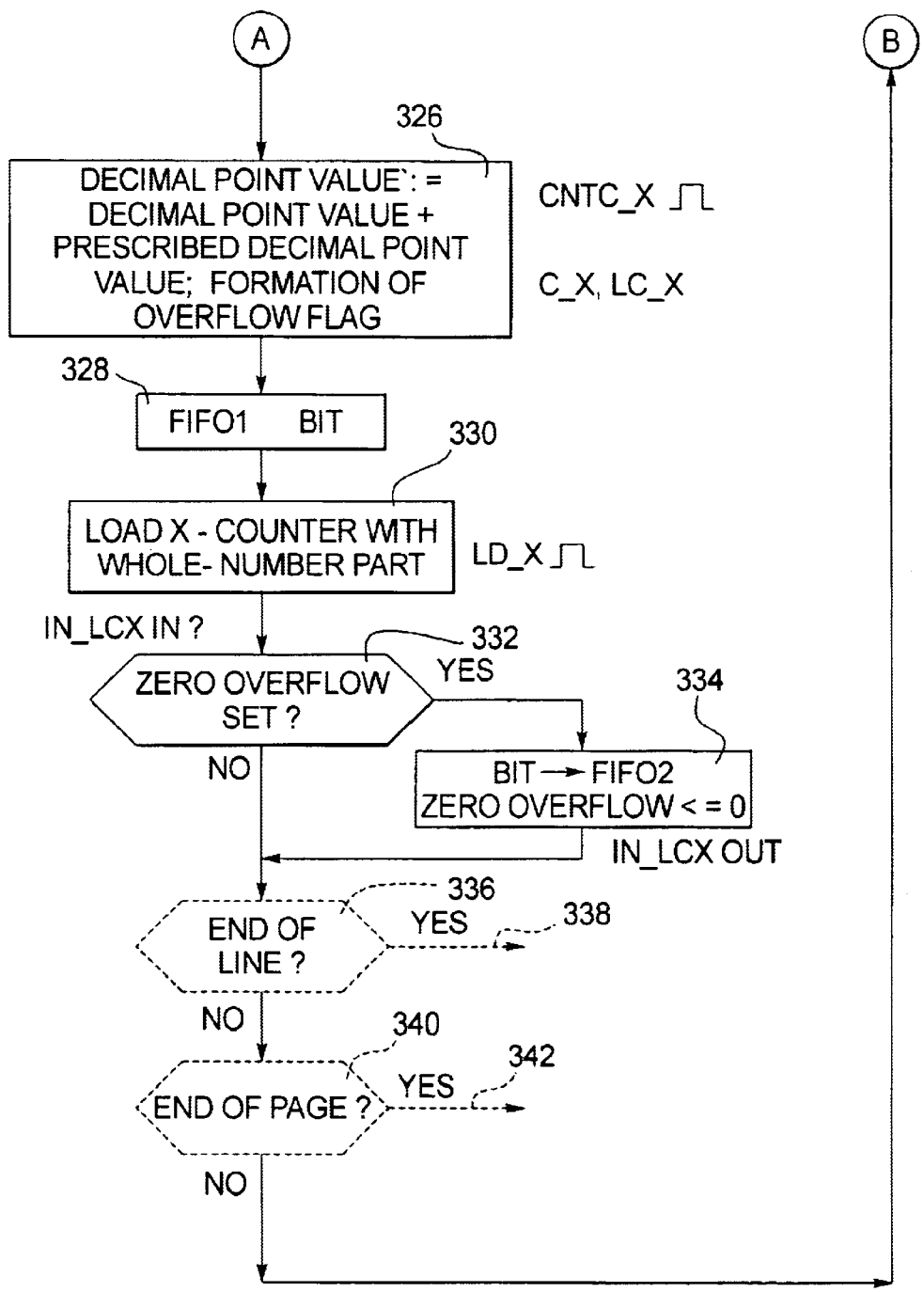
Figure 6:
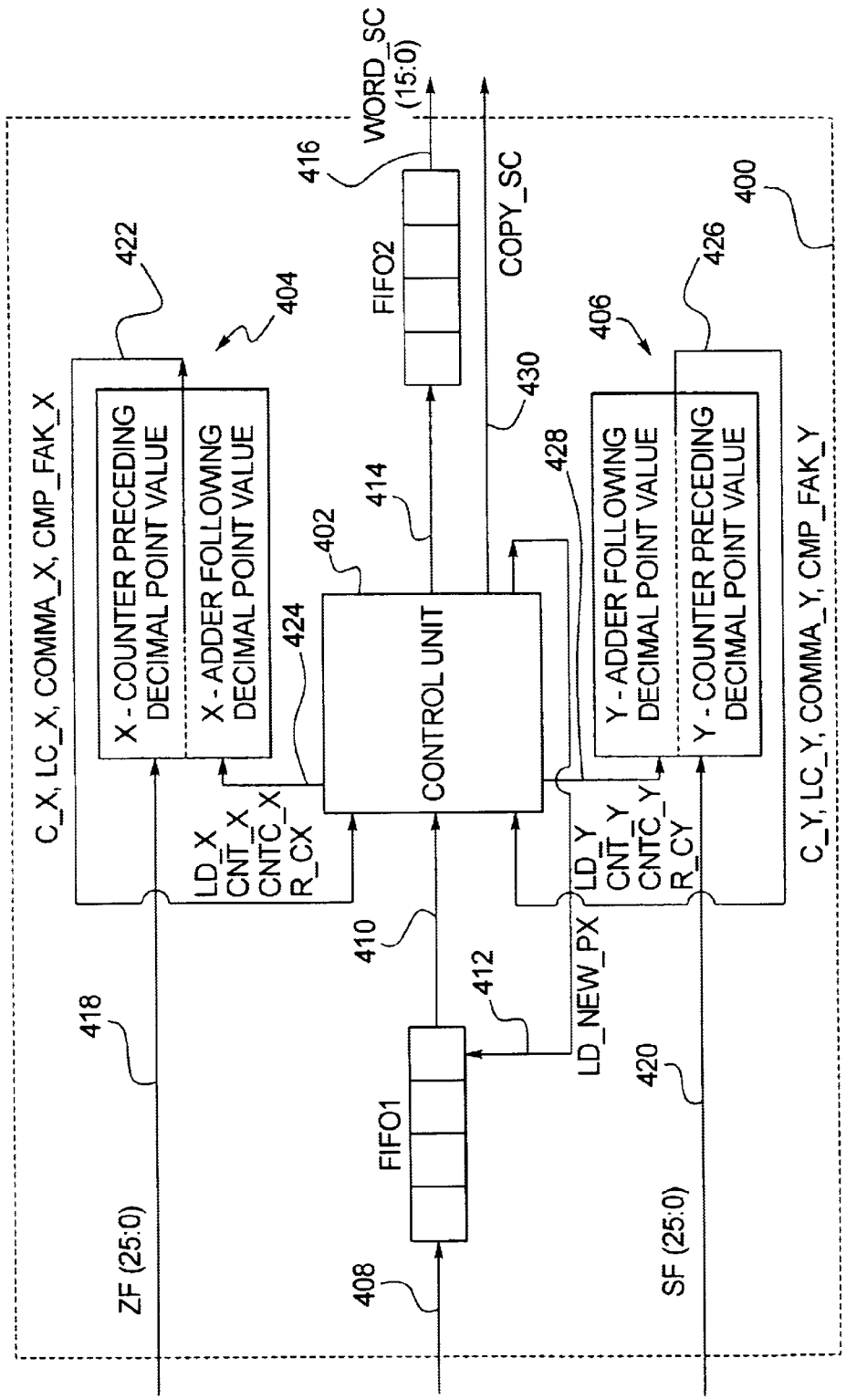

Exemplary embodiments of the method of the invention are explained below with reference to the drawings. Shown therein are:

FIG. 1 a flow chart of a method for generating a target image with a resolution or size modified compared to a source image;

FIG. 2 a flow chart for the method steps for generating a target image line having a resolution or size modified in comparison to a source image line;

FIG. 3 a source image and a target image generated from this source image with a greater expanse in line direction (expansion);

FIG. 4 a further source image and a target image generated from the further source image with a smaller expanse in line direction (compression);

FIGS. 5A and 5B a simplified flow chart for describing the events in a circuit arrangement that implements the method shown in FIG. 2;

FIG. 6 the block circuit diagram of said circuit arrangement; and

FIGS. 7A and 7B two excerpts from computer programs.

DETAILED DESCRIPTION OF THE INVENTION

FIG. 1 shows a flow chart of a method for generating a target image having a resolution or size modified compared to a source image. The source image data, for example, are received successively via one or more data lines (not shown) or are stored in a memory (not shown). Given the transmission of the source image data as data stream for successive lines via the data lines, the source image data are received line-by-line and, for example, from left to right within the lines. When the source image data are deposited in the memory, then source image data for successive source picture elements of a line are usually stored in memory cells with successive addresses, so that the address only has to be respectively incremented by a fixed value given a line-by-line reading of the source image data. It shall be assumed below when explaining the method that the source image data are received as data stream. The following comments, however, also analogously apply to the case that the source image data are stored in a memory.

The method begins in a step 100 when the first source image datum is received. At the start of the method in step 100, all initialization events were already carried out. In particular, a column factor SF and a line factor ZF were prescribed. The column factor SF defines the ratio of the number of target picture elements per column of the target image relative to the number of source picture elements per column of the source image. The line factor ZF defines the relationship of the number of target picture elements per line of the target image relative to the number of source picture elements per line of the source image. The column factor SF and the line factor ZF can be selected independently of one another, whereby both factors are positive.

In the following step 102, a column variable SV receives the value of the column factor SF as start value. In step 104, a line variable ZV then receives the value of the line factor ZF as start value.

A check is carried out in step 106 to see whether the momentary value of the column variable is greater than zero. When this is the case, then target image data are generated from the source image data for the source picture elements of the line of the source image processed at the moment according to a method explained below with reference to FIG. 2. Upon initial implementation of the step 108, these are the target image data of the first line of the target image. The generation of the target image data is especially simple when the line factor ZF has the numerical value "1", i.e. no compression or expansion or, respectively, increase or decrease in resolution occurs in line direction. In this case, the source image data of the source image line processed at the moment merely have to be transferred as target image data.

Step 108 is followed by step 110 in which the value of the column variable SV is reduced by the numerical value "1". Subsequently, the method is continued in a step 112 that is explained farther below.

When, by contrast, it is found in step 106 that the momentary value of the column variable SV is not greater than zero, then a step 114 immediately follows step 106, the processing of the source image data of a following line of the source image being begun with said step 114. This means that the source image data of the following line are processed in the next running of the step 108. When the step 108, however, is not implemented before the next implementation of the step 114, then the source image data of the following line are not employed. As warranted, the source image data of a plurality of lines are thus not further-processed. This is always the case when the column factor SF is significantly less than one and, for example, has the value 0.3.

When step 114, on the other hand, is not implemented between the repeated implementation of the step 108, for example given a column factor of 3.3, then the target image data of a plurality of target image lines are generated from the source image data of the source image line processed at the moment. In order to avoid a repetition of calculation events, target image data of a target image line are generated from the source image data of the line processed at the moment only once and are then stored. These target image data are copied until the source image data of a next source image line are processed. This, however, is only the case when ste 114 is implemented again.

In a step 116 immediately following step 114, the value of the column factor SF is added to the momentary value of the column variable SV. Subsequently, the method is continued in step 112.

In step 112, a check is carried out to see whether all source image data have already been processed. When this is not the case, then the method is continued in a step 104 and a loop composed of method steps 104 through 112 is run. The target image data are thereby successively generated for successive lines of the target image.

The loop composed of the method steps 104 through 112 is only departed in step 112 when it is found that all source image data of the source image have already been processed and, thus, all target image data of the target image have been generated.

In this case, the method is ended in step 118. The target image data of the target image were sent to a print head of a printer in the sequence of their generation during the method. Alternatively, the target image data can also be stored in a memory for further processing.

FIG. 2 shows a flowchart related to the generation of the target image data of a target image line from source image data for the source picture elements of a source image line that has a different number of source picture elements or the same number of source picture elements compared to the number of target picture elements in the target image line. Dependent on the line factor ZF, the target image line has more target picture elements than the source image line when the line factor ZF is greater than one and has fewer target picture elements when the line factor ZF is smaller than one.

The method that is shown in the flowchart of FIG. 2 begins in a step 200. This step follows immediately after the step 106 (see FIG. 1) when it is found in step 106 that the column variable SV has a value greater than zero.

Following 200, a step 202 is implemented wherein a check is carried out to see whether the momentary value of the line variable ZV is greater than zero. When this is the case, then the source image datum processed at the moment is employed as target image datum, see step 204. The transfer of the source image datum as target image datum ensues, for example, in a copying event.

In a step 206, the momentary value of the line variable ZV is subsequently diminished by the numerical value "1". After this, the method is continued in a step 208 explained below.

When, by contrast, it is found step 202 that the line variable ZV is not greater than zero, then the step 210 is implemented immediately after the step 202. The next, received source image datum is processed in step 210. This means that this source image datum is transferred in the next processing of the step 204. When the step 204, however, is not implemented before the next implementation of the step 210, then the image datum fetched in step 210 is not taken as target image datum. This means that this source image datum is simply skipped. A skipping of source image data occurs when the line factor ZF has a value smaller than one. When, on the other hand, the step 204 is repeatedly repeated without intervening implementation of the step 210, then the source image datum processed at the moment remains unmodified, so that a plurality of target image data are generated from it. This is the case given a line factor greater than one.

A step 212 is implemented after the step 210. In step 212, the value of the line factor ZF is added to the momentary value of the line variable ZV. Subsequently, the method is continued in step 208.

A check is carried out in step 208 to see whether all source image data of the processed line were processed and, thus, the line end has been reached. When this is not the case, then the method is continued in step 202. The method is thus in a loop composed of method steps 202 through 208. This loop is left in step 208 only when the line end is reached. In this case, the step 214 immediately follows the step 208.

The method for processing a source image line is ended in step 214. Step 214, however, is followed by step 110 (see FIG. 1), so that further source image lines are potentially processed.

Given the method described in FIGS. 1 and 2, SV>0? Or, respectively, ZV>0? Are employed as comparison operations, the value one is subtracted from the scaling variables SV, ZV in steps 110 or, respectively, 206, and the scaling factor SF or, respectively, ZF is respectively added to the line variable SV, ZV in steps 116 or, respectively, 212. Figure A shows an excerpt formulated in the syntax of the programming language "C" wherein this method is employed. Thereby denoting are:

px: pixel or, respectively, column index py: line index scx, scy: scaling factor in column or, respectively, line direction cx, cy: plurality of pixels per line or, respectively, plurality of lines per image.

Alternatively to this method, SV<0? And ZV<0? can be employed as comparison operations 106 and 202 when the value one is respectively added to the scaling variables SV, ZV in steps 110 and 206 (SV:=SV+1; ZV:=ZV+1) and the respective scaling factors SF, ZF are subtracted from the scaling variables SV, ZV in steps 116 and 212. Figure B shows a program excerpt for this alternative.

A part a of FIG. 3 shows a source image 250 on which what is referred to as the "Apfelmannchen" is shown. The source image 250 has the same expanse in line direction (x axis) as in column direction (y axis). After the processing of the source image data belonging to the source image 250 with the methods shown in FIGS. 1 and 2, a target image 252 shown in part b of FIG. 3 arises from the source image 250. The column factor SF thereby has the value one, and the line factor ZF has the value 5.75. Compared to the source image 250, the target image 252 is thus stretched by the factor 5.75 in line direction (x axis). In column direction, the target 252 has the same expanse as the source image 250. The size of the picture elements of the source image 250 coincides with the size of the target picture elements in the target image 252. The source image 250 and the target image 252, moreover, have the same resolution.

A part a in FIG. 4 shows a further source image 260 with an illustration of the "Apfelmannchens". The source image 260 has the same expanse in line direction (x axis) and in line [sic] direction (y axis). By processing the source image data of the source image 260 according to the method explained with reference to FIGS. 1 and 2, target image data of a source image 262 shown in part b of FIG. 4 are generated. The line factor ZF thereby has the value 0.175, so that the target image 260 is compressed in line direction by this factor compared to the source image 260. The column factor SF has the value one, so that the target image 262 has the same expanse in column direction (y axis) as the source image 260 in column direction. The size of the picture elements of the source image 260 coincides with the size of the target picture elements in the target image 262. Moreover, the source image 260 and the target image 262 have the same resolution.

Figures A and B show a simplified flowchart of the procedures in a digital, clock-controlled circuit arrangement (see FIG. 6) wherein the method shown in FIG. 2 is implemented. Special characteristics that become clear below derive due to the realization of the method steps shown in FIG. 2 in the circuit arrangement, which has only switch conditions. The flowchart shown in Figures A and B is a simplified illustration of a flowchart for describing the circuit arrangement in the known language of VHDL (very high speed integrated circuit hardware description language).

In a step 300, the circuit arrangement (see FIG. 6) is placed into a defined start condition by a reset signal. What the start signal causes is that the circuit arrangement sets predetermined signals into their starting condition. These signals are partly interrogated only in the circuit arrangement and the other part thereof are also interrogated outside the circuit arrangement or, respectively, employed for controlling switch statuses.

In step 302, the circuit arrangement begins processing the first source image datum that is read from a memory FIFO1 that works according to the FIFO principle (first-in-first-out).

In the following step 304, the status of a signal COMA_X is interrogated, the value thereof indicating whether the line factor ZF is a whole number or not a whole number. When the line factor ZF is not a whole number—the signal COMA_X has the status EIN—(yes in step 304), then a signal IN_CX is switched into the status EIN in step 306. Since the step 304 is respectively implemented only for the first source image datum of the source image line processed at the moment, it can also be assumed given the status EIN of the signals IN_CX that the source image datum processed at the moment is the first source image datum of a source image line. This assumption is based on an interrogation of the status of the signal IN_CX explained below in step 320. The step 306 is then followed by step 308.

Step 308, however, is implemented immediately after step 304 when it is found in step 304 that the line factor ZF is a whole number and, thus, the signal COMMA_X has the status AUS (no in step 304). In step 308, the status of signal CMP_FAK_X is interrogated. The signal CMP_FAK_X has the status EIN when the counter reading in a pre-decimal-point counter has the value one. The counter reading of the pre-decimal-point counter represents the momentary value of the whole-numbered part, i.e. of the pre-decimal-point part, of the line variable ZV. In all other counter readings, the signal CMP_FAK_X has the status AUS, which thus indicates that the pre-decimal-point value of the line variables ZV is greater than one. When this is the case (yes in step 308), then the source image datum processed at the moment is copied in step 310, and the copy of the source image datum is written as target image datum into a memory FIFO2 that likewise works according to the FIFO principle (first-in-first-out). In step 310, moreover, a signal CNT_X is briefly set into the status EIN, so that a clock pulse is generated that diminishes the counter reading of the pre-decimal-point value counter by the numerical value "1". Step 310 is again followed by step 308, so that a loop composed of steps 308 and 310 is processed, this being left only when the signal CMP_FAK_X has the status EIN in step 308 (no in step 308). In this case, step 308 is immediately followed by step 312.

In step 312, the status of a signal C_X is interrogated, this having the status EIN when an overflow has occurred in a post-decimal-point value adder. The momentary value of the post-decimal-point value of the line variable ZV is stored in the post-decimal-point value adder, the post-decimal-point value of the line factor ZF being cyclically added thereto (see below, step 326). An overflow occurs when the result of the addition is greater than the highest number presentable in the post-decimal-point value adder. When no overflow occurred given the last addition in the post-decimal-point value adder, then the signal C_X has the status AUS.

When the signal C_X in step 312 has the status EIN (yes in step 312), then the step 314 is implemented immediately after the step 312. Dependent on the status of a signal LC_X, different successor steps are implemented in step 314. The signal LC_X has the status EIN when the addition result is zero given overflow in the post-decimal-point value adder. Otherwise, the signal LC_X has the status AUS. When this is the case, then the source image datum processed at the moment is copied in step 316 and is written into the memory FIFO2 as target image datum. Moreover, the signal C_X for the overflow is set into the status AUS in step 316. This ensues by setting a signal R_CX to the status EIN. After this, step 312 is implemented again, it being found, however, this time that the signal C_X has the status AUS. When the signal LC_X in step 314, by contrast, has the status EIN, i.e. the addition result in the adder was zero given overflow of the post-decimal-point value adder, then step 318 follows step 314.

A signal IN_LCX is set into the status EIN in step 318. The status of the signal IN_LCX thus indicates whether a post-decimal-point value of zero (status EIN) or greater than zero (status AUS) occurred in the overflow in the post-decimal-point value adder. Moreover, the signal C_X for the overflow is set into the status AUS in step 318. This ensues by setting the signal R_CX to the status EIN. Step 318 is followed by step 320.

Step 320 is also implemented immediately after step 312 when the signal C_X for the overflow has the status AUS in step 312. In step 320, further processing is dependent on the status of the signal IN_CX. As already mentioned, this signal only has the status EIN when the line factor ZF is not a whole number and the first source image datum of a source image line is being processed at the moment. When the signal IN_CX in step 320 has the status EIN, then step 322 follows. In step 322, the source image datum processed at the moment is copied and written into the memory FIFO2 as target image datum. Moreover, the signal IN_CX is set into the status AUS in step 322. Step 324 is implemented after step 322.

Step 324 is also implemented immediately after step 320 when the signal IN_CX has the status AUS in step 320. In step 324, the source image datum processed at the moment is taken as target image datum and written into the memory FIFO2. Subsequently, the step 326 shown in Figure B is implemented.

In step 326, a signal CNTC_X is briefly switched into the status EIN, so that a clock pulse is generated that is adjacent at the post-decimal-point value adder. Subsequently, the post-decimal-point value adder outputs a value incremented by the post-decimal-point value of the line factor ZF at its output. When an overflow occurs in the addition, then the signal C_X is switched into the status EIN. Dependent on the output value of the adder following the addition, the signal LC_X is set to the value EIN when the output value is zero and is set to the value AUS when the output value of the adder is greater than zero.

In step 328, the next source image datum is read from the memory FIFO1 and is treated as source image datum processed at the moment. Step 330 subsequently follows. In step 330, a signal LD_X is briefly switched into the condition EIN, so that a clock pulse arises that loads the pre-decimal-point value counter with the whole-numbered part of the line factor ZF as start value. The counter reading of the pre-decimal-point value counter is then diminished proceeding from the start value upon execution of the step 310.

In step 332, the status of the signal IN_LCX is interrogated, this having the status EIN when, given overflow of the post-decimal-point value adder, an overflow to zero has occurred. When this is the case, then a step 334 is implemented wherein the source image datum processed at the moment and read in step 328 is taken as target image datum. The target image datum is then written into the memory FIFO2. Moreover, the status of the signal IN_LCX is switched to AUS in step 334. Subsequently, the step 336 is implemented. This step is also implemented immediately after the step 340 when the signal IN_LCX has the status AUS in this step.

In step 336, the status of a signal is interrogated that indicates whether the last source image datum of a line has already been processed. When this is the case, then steps are carried out that prepare the processing of a new line of the source image. The execution of these steps is merely indicated with an arrow 338 and is not explained since it is not critical for an understanding of the invention. When, by contrast, it is found in step 336 that the last source image datum of the source image line processed at the moment was not yet processed, then the step 340 is implemented immediately following step 336.

In step 340, a signal is interrogated whose status indicates whether the last source image datum for a source picture element of the source image was already processed. When this is the case, then the processing of the source image data of a next source image is readied. The steps needed for this purpose are not shown in Figures A and B and are merely indicated with an arrow 342. When, by contrast, it is found in step 340 that all source image data of a source image and, thus, all source image data of the print image in a printer have not yet been processed, then the step 308 is implemented anew immediately after the step 340.

By multiple processing of the steps 308 through 342, the source image data for the source picture elements of a line of the source image are generated [. . . ] the target image data for the target picture elements of a line of the target image. [sic]

FIG. 6 shows a block circuit diagram of the circuit arrangement 400 whose switch behavior was explained with reference to the flowchart in Figures A and B. The circuit arrangement 400 shown in FIG. 6 is, as already mentioned, a digital, clocked circuit that is preferably contained in a single ASIC module (application-specific integrated circuit). For simplifying the illustration, all clock lines to the individual function units have been omitted from FIG. 6. Moreover, lines for reset pulses with which the circuit arrangement 400 is placed into a defined initial condition are not shown.

The circuit arrangement 400 contains the memories FIFO1 and FIFO2, a control unit 402, a line factor unit 404 as well as a column factor unit 406.

The memories FIFO1 and FIFO2 work according to the known FIFO principle wherein data written in first are also read out first. Together with the control unit 402, they form what is referred to as a pipeline structure, whereby data to be processed can be simultaneously read from FIFO1 into the control uni 402 while processed data are written from the control unit 402 into FIFO2. Lines for status interrogation of the memories FIFO1 and FIFO2 are not shown in FIG. 6. It is assumed that the control unit 402 only reads a source image datum from the memory FIFO1 when at least one source image datum is stored in the memory FIFO1. On the other hand, the control unit 402 only writes a target image datum into the memory FIFO2 when all memory cells of the memory FIFO2 have not yet been occupied.

The source image data are successively written into the memory FIFO1 from the outside via a write line 408. A read line 410 between memory FIFO1 and control unit 402 transmits the source image data to the control unit 402 upon readout from the memory FIFO 1. The status of a signal LD_NAW_PX on a control line 412 controls the read out of source image data from the memory FIFO1. The status of this signal is set by the control unit 402.

The control unit 402 has its output side electrically connected to the input of the memory FIFO2 via a write line 414. Target image data are transmitted from the control unit 402 to the memory FIFO2 via this line until they are read from the memory FIFO2 via a read bus 416 having a bit width of 16 bits. The read bus 416 is conducted out of the circuit arrangement 400, so that data can be transmitted, for example, to a print head of a printer or into a memory via it.

Via a data line 418, the line factor ZF is communicated from the outside to the line factor unit 44 in a data word that is 26 bits long. Via a further data line 420, the column factor SF is communicated from the outside to the column factor unit 406 in a data word that is 26 bits long. The data lines 418 and 420 thus come from circuit units that do not belong to the circuit arrangement 400.

The line factor unit 404 contains the aforementioned pre-decimal-point value counter and the post-decimal-point value adder wherein the pre-decimal-point value or, respectively, the post-decimal-point value of the line variables ZV are processed. The line factor unit 404 has its output side connected via a control bus 422 to an input of the control unit 402. The statuses of the signals C_X, LC_X, COMMA_X and CMP_FAK_X are signaled to the control unit 402 on the control bus 422. On the other hand, the control unit 402 has its output side connected via a control bus 424 to the line factor unit 404. The statuses of the signals LD_X, CNT_X, CNTC_X and R_CX are signaled to the line factor unit 404 from the control unit 402 on the control bus 424.

The column factor unit 406 contains a pre-decimal-point value counter wherein the pre-decimal-point value of the column variables SV is processed. Moreover, the column factor unit 406 contains a post-decimal-point value adder wherein the post-decimal-point value of the column variables SV are processed. The output side of the column factor unit 406 is connected via a control bus 426 to inputs of the control unit 402. Signal C_Y, LC_Y, COMMA_Y and CMP_FAK_Y are forwarded to the control unit on this control bus, these having essentially the same function as the signals on the control bus 422 but being referred to the processing of the column variables SV.

The control unit 402 is connected to the column factor unit 406 via a control bus 428. Signals LD_Y, CNT_Y, CNTC_Y and R_CY, which are signaled from the control unit 402 to the column factor unit 406 on the control bus 428, have essentially the same function as the signals that are transmitted to the line factor unit 404 on the control bus 424 but are referred to the processing of the column variables S.V.

The control unit 402 also has an output line 430 that signals the status of a signal COPY_SC to circuit units lying outside the circuit arrangement 400. The signals COPY_SC has the status EIN when the target image data of the most recently processed source image line are to be copied.

| | List of Reference Characters |
|---|---|
| SF | column factor |
| ZF | line factor |
| SV | column variable |
| ZV | line variable |
| 100 | start |
| 102 | SV: SF (column factor) |
| 104 | SV: ZF (line factor) |
| 106 | SV > 0 |
| 108 | generated target image line or, respectively, copied target image line |
| 110 | SV: – SV –1 |
| 112 | image end |
| 114 | next source image line |
| 116 | SV: = SV + SF |
| 118 | end |
| 200 | start |
| 202 | ZV > 0 |
| 204 | copy image datum |
| 206 | ZV: = ZV – 1 |
| 208 | line end |
| 210 | fetch next image datum |
| 212 | ZV: = ZV + ZF |
| 214 | end |
| 250, 260 | source image |
| 252, 262 | target image |
| 300 | start |
| 302 | FIFO1 → bit |
| 304 | pre-decimal-point value = 0 (COMA_X EIN) |
| 306 | decimal point flag <= 1 |
| 308 | factor > 1 |
| 310 | bit → FIFO2, factor': = factor – 1 |
| 312 | overflow flag set |
| 314 | decimal point value on, 0 |
| 316 | bit → FIFO2, overflow flag <= 0 |
| 318 | zero overflow flag <= 1 |
| 320 | decimal point flag set |
| 322 | bit → FIFO2 decimal point flag <= 0 |
| 324 | bit → FIFO2 |
| 326 | decimal point value': = decimal point value + prescribed decimal point value; formation of the overflow flag |
| 328 | FIFO1 → bit |
| 330 | load x-counter with whole-numbered part |
| 332 | zero overflow flag set |
| 334 | bit → FIFO2 zero overflow flag <= 0 |
| 336 | line end |
| 338 | arrow |
| 340 | page end |
| 342 | arrow |
| FIFO1, FIFO2 | memory |
| COMMA_X | signal, EIN when line factor not a whole number |
| IN_CX | signal, EIN when first source image datum of a line and when COMMA_X on EIN |
| CMP_FAK_X | signal, EIN when counter reading in pre-decimal point value counter (ZV) equal to one |
| CNT_X | signal, clock for deincrementation of the pre-decimal point value counter (ZV) |
| C_X | signal, EIN when overflow in the post-decimal point-value counter (ZV) |
| LC_X | signal, EIN when line factor not a whole number |
| R_CX | auxiliary signal for setting C_X |
| IN_LCX | signal, EIN when LC_X to EIN |
| CNTC_X | signal, clock for adding the post-decimal point value in the post-decimal point value adder (ZV) |
| LD_X | signal, clock, load pre-decimal point value counter (ZV) |
| LD_NEW_PX | read FIFO1 |
| COMMA_Y | signal, EIN when column factor not a whole number |
| IN_CY | signal, EIN when first source image datum of a line and when COMMA_Y at EIN |
| CMP_FAK_Y | signal, EIN when counter reading in pre-decimal-point value counter (SV) equal to one |
| CNT_Y | signal, clock for deincrementation of the pre-decimal-point value counter (SV) |
| C_Y | signal, EIN when overflow in the post-decimal point value adder (SV) |
| LC_Y | signal, EIN when overflow in the post-decimal-point value adder (SV) equal to zero |

-continued

List of Reference Characters

| | |
|---|---|
| R_CY | auxiliary signal for setting C_Y |
| IN_LCY | signal, EIN when LC_Y at EIN |
| CNTC_Y | signal, clock for adding the post-decimal point value in the post-decimal-point value adder (SV) |
| LD_X | signal, clock, load pre-decimal-point value counter (ZV) |
| LD_NEW_PX | read FIFO1 |
| 400 | circuit arrangement |
| 402 | control unit |
| 404 | line factor unit |
| 406 | column factor unit |
| 408 | write line |
| 410 | read line |
| 412 | control line |
| 414 | write line |
| 416 | read bus |
| 418, 420 | data line |
| 422, 424 | control bus |
| 426, 428 | control bus |
| 430 | line |

What is claimed is:

1. A method for processing image data, comprising the steps of:
   providing a source image to be processed that contains source picture elements arranged in a matrix-like arrangement, a respective source image data being allocated to said source pictures elements and determining a presentation of the respective source picture element;
   defining a target image which contains target picture elements arranged in a matrix-like arrangement to which a respective target image datum is allocated that determines a presentation of the respective target picture element;
   prescribing a scaling factor that determines a ratio of a number of target picture elements per line or column or said target image to a number of source picture elements per line or column of said source image;
   successively processing said source image data for successive source picture elements of a line or column of said source image;
   prescribing a scaling variable;
   proceeding from a start value, cyclically implementing the sub-steps of:
      a) comparing said scaling variable to a comparison value, and
      b) making a decision dependent on a comparison result as to whether:
         b1) a source image datum is taken as a target image datum and a constant value is added to the scaling variable, or
         b2) said scaling factor is subtracted from said scaling variable;
   defining said start value and a comparison criterion such that a first source image datum is taken as a target image datum, and
   performing processing in a pipeline process such that the image data are loaded into a processing stage line-by-line or column-by-column from a first memory in a processing clock via a first data line, are processed in said processing stage in at least one following clock and are subsequently loaded in a further clock via a second line separate from the first data line, being loaded into a second memory.

2. A method for processing image data, comprising the steps of:
   providing a source image to be processed that contains source picture elements arranged in a matrix-like arrangement, a respective source image data being allocated to said source picture elements and determining a presentation of the respective source picture element;
   defining a target image that contains target picture elements arranged in a matrix-like arrangement to which a respective target image datum is allocated that determines a presentation of the respective target picture element;
   prescribing a scaling factor that determines a ratio of a number of target picture elements per line or column of said target image to a number of source picture elements per line or column of said source image,
   successively processing said source image data for successive source picture elements of a line or column of the source image;
   prescribing a scaling variable;
   proceeding from a start value, cyclically implementing the following sub-steps:
      a) comparing said the scaling variable to a comparison value, and
      b) making a decision dependent on a comparison result as to whether:
         b1) a source image datum is taken as a target image datum and a constant value is subtracted from said scaling variable or
         b2) said scaling factor is added to said scaling variable,
   defining said start value and a comparison criterion such that a first source image datum is taken as a target image datum, and
   performing processing in a pipeline process such that said image data are loaded into a processing stage line-by-line or column-by-column from a first memory in a processing clock via a first data line, are processed in said processing stage in at least one following clock and are subsequently loaded in a further clock via a second line separate from the first data line, being loaded into a second memory.

3. A method according to claim 1, wherein at least said processing unit is contained in an application-specific integrated circuit.

4. A method for processing image data, comprising the steps of:

providing a source image to be processed that contains source picture elements arranged in a matrix-like arrangement, a respective source image data being allocated to said source picture elements and determining a presentation of said respective source picture element;

defining a target image that contains target picture elements arranged in a matrix-like arrangement to which a respective target image datum is allocated that determines a presentation of the respective target picture element;

prescribing a scaling factor that determines a ratio of a number of target picture elements per line or column of said target image to a number of source picture elements per line or column of said source image;

employing said scaling factor as a start value for a scaling variable;

successively processing said source image data for successive source picture elements of a line or column of said source image;

cyclically implementing the following steps:
a) when a momentary value of said scaling variables is greater than zero, copying said source image datum being processed at the moment and employing said source image data as a target image datum; and reducing a momentary value of said scaling variable by a numerical value;
b) when a momentary value of said scaling variable is not greater than zero, employing a next source image datum instead of a source image datum being processed at the moment; and
adding a value of said line factor to a momentary value of said scaling variables;

successively generated target image data belonging to successive target picture elements of a line or column of the target image, and performing processing in a pipeline process such that the image data are loaded into a processing stage line-by-line or column-by-column from a first memory in a processing clock via a first data line, are processed in said processing stage in at least one following clock and are subsequently loaded in a further clock via a second line separate from the first data line, being loaded into a second memory.

5. A method according to claim 4, further comprising the steps of:

successively implementing said steps both for image lines as well as for image columns; and prescribing a line factor as a scaling factor for processing line data and prescribing a column factor as a scaling factor for processing column data.

6. A method according to claim 4, further comprising the steps of:

only generating target image data in step A according to a line processing method when no target image data have been produced according to a predetermined line processing method for the source image data processed at the moment; and otherwise generating said target image data according to said predetermined line processing method.

7. A method according to claim 5, further comprising the steps of:

prescribing a line factor that determines the ratio of the number of target picture elements per line of the target image to the number of source picture elements per line of the source image;

employing the line factor as a start value for a line variable;

successively processing the source image data of successive source picture elements of at least one line of the source image;

cyclically implementing the following sub-steps in an execution of the line processing method:
a) when a momentary value of the line variable is greater than zero, copying said the source image datum being processed at the moment and employing said source image datum as a target image datum;
reducing the momentary value of the line variable by a numerical value;
b) when a momentary value of the line variable is not greater than zero, employing a next source image datum instead of the source image datum being processed at the moment;
adding a value of the line factor to the momentary value of the line variable.

8. A method according to claim 1, further comprising the step of:

separating a value of at least one of the line variable and the column variable into a pre-decimal-point value and a post-decimal-point value.

9. A method according to claim 8, further comprising the step of:

providing a pre-decimal-point value as a counter value in a counter that is deincremented from a predetermined start value; and said predetermined start value being a whole-numbered pre-decimal-point value of the line factor or of the column factor.

10. A method according to claim 9, wherein said counter includes basic digital gates.

11. A method according to claim 8, further comprising the step of:

calculating said post-decimal-point value in an adder for whole-numbered additions; and said adder includes basic digital gates.

12. A method according to claim 1, further comprising the steps of:

given a scaling factor that is greater than one, generating said target image data of a plurality of groups of target image data from the source image data of a group of source image data processed at the moment, generating only one group of target image data from the group of source image data, storing and subsequently copying said group of target image data until a next group of source image data is processed.

13. A circuit arrangement for processing image data, comprising:

an input unit fashioned as a first memory that receives source image data for source picture elements of a source image in which the source picture elements are arranged in a matrix-like arrangement;

a processing unit that further-processes the source image data into target image data according to a predetermined line factor;

the processing ensues in a pipeline process such that the image data are loaded into a processing stage line-by-line or column-by-column from said first memory in a processing clock via a first data line, are processed in said processing stage in at least one following clock and are subsequently loaded in a further clock via a second line separate from the first data line, being loaded into a second memory;

the line factor being employed as a start value for a line variable;

the source image data for successive source image elements of at least one line of the source image being successively processed; and the following steps are cyclically implemented:
  a) when a momentary value of the line variable is greater than zero, the source image datum processed at the moment is copied and employed as a target image datum; further, the momentary value of the line variable is reduced by a numerical value;
  b) when the momentary value of the line variable is not greater than zero, a next source image datum is employed instead of the source image datum processed at the moment; further, a value of the line factor is added to the momentary value of the line variable.

14. A circuit arrangement for processing image data, comprising:

an input unit that receives source image data for source picture elements of a source image in which the source picture elements are arranged in a matrix-like arrangement;

a processing unit that further-processes the source image data into target image data according to a predetermined column factor;

the column factor is employed as a start value for a line variable;

the source image data for successive source image elements of at least one line of the source image are successively processed;
  A) when a momentary value of the column variable is greater than zero, target image data are generated from the source image data processed at the moment according to a predetermined line processing method; further, the momentary value of the column variable is reduced by a the numerical value;
  B) when the momentary value of the column variable is not greater than zero, the source image data of the next line are employed instead of the source image data employed at the moment; further, the value of the column factor is added to the momentary value of the column variable; and an output unit for outputting the successively ensuing target image data, the image data are loaded into a processing stage line-by-line or column-by-column from a first memory in a processing clock via a first data line, are processed in said processing stage in at least one following clock and are subsequently loaded in a further clock via a second line separate from the first data line, being loaded into a second memory.

15. A circuit arrangement according to claim 13, wherein at least the processing unit are contained in an application-specific integrated circuit.

16. A circuit arrangement according to claim 13, further comprising:

a control unit to which said first memory is connected via a first data line, and said control unit being connected to said a second memory via a second data line separate from said first data line.

17. A printer having a circuit arrangement for processing image data according to claim 13.

18. A method for scaling image data from a source image raster into a target image raster, comprising the steps of:

prescribing a scaling factor by a ratio between a target image raster and a source image raster, including the sub-steps of:
  a) successively processing source image data of successive source picture elements of a line or column of the source image;
  b) prescribing a scaling variable proceeding from a start value and, cyclically comparing the scaling variable to a comparison value according to a comparison criterion and making a decision dependent on a comparison result as to whether a source picture datum is taken as a target picture datum,
  c) determining the start value and the comparison criterion such that a first source picture datum of the line or column is taken as a target image datum, and
  d) performing the processing in a pipeline process such that the image data are loaded into a processing stage line-by-line or column-by-column from a first memory in a processing clock via a first data line, are processed in said processing stage in at least one following clock and are subsequently loaded in a further clock via a second line separate from the first data line, being loaded into a second memory.

* * * * *